Patented Jan. 6, 1925.

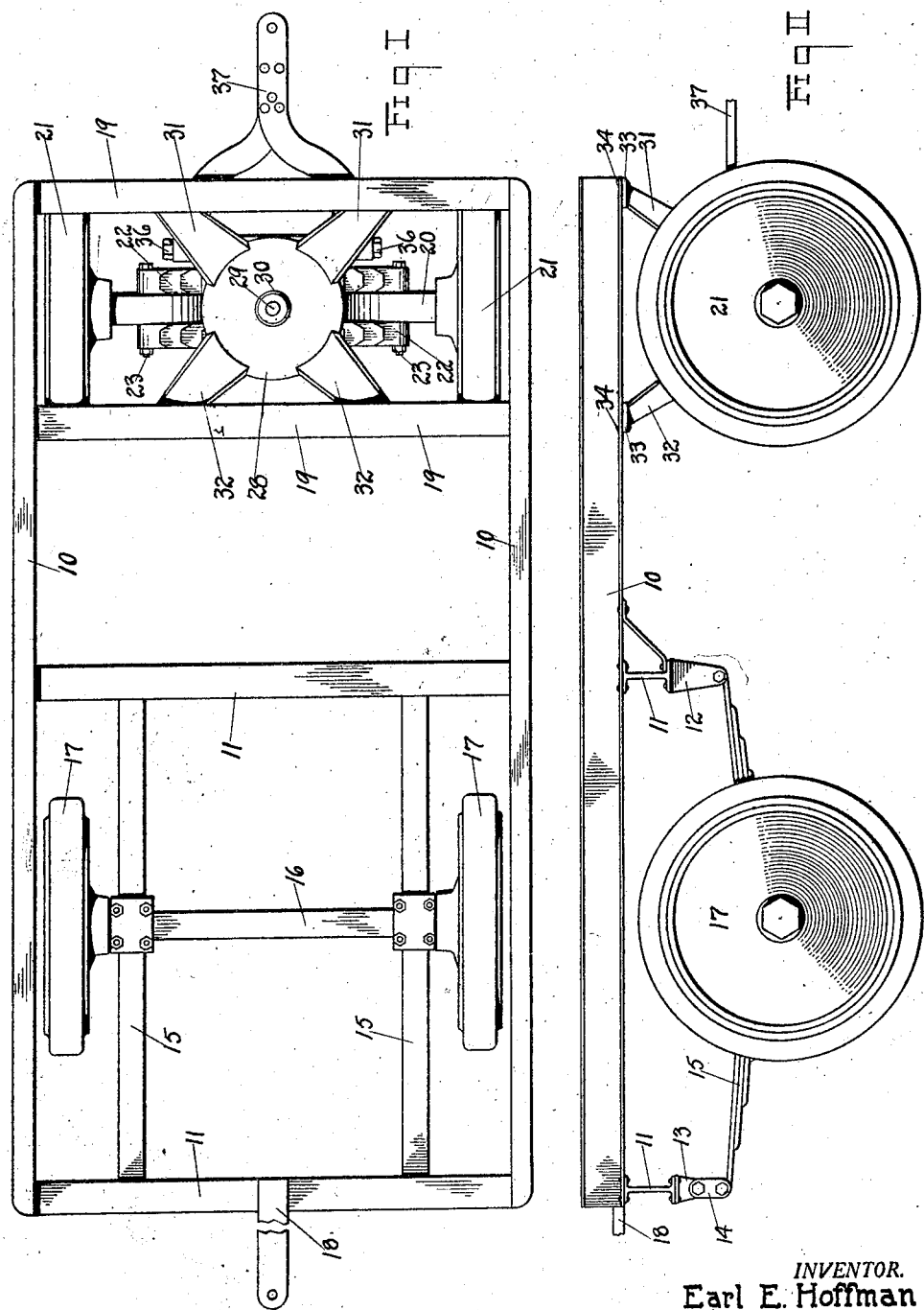

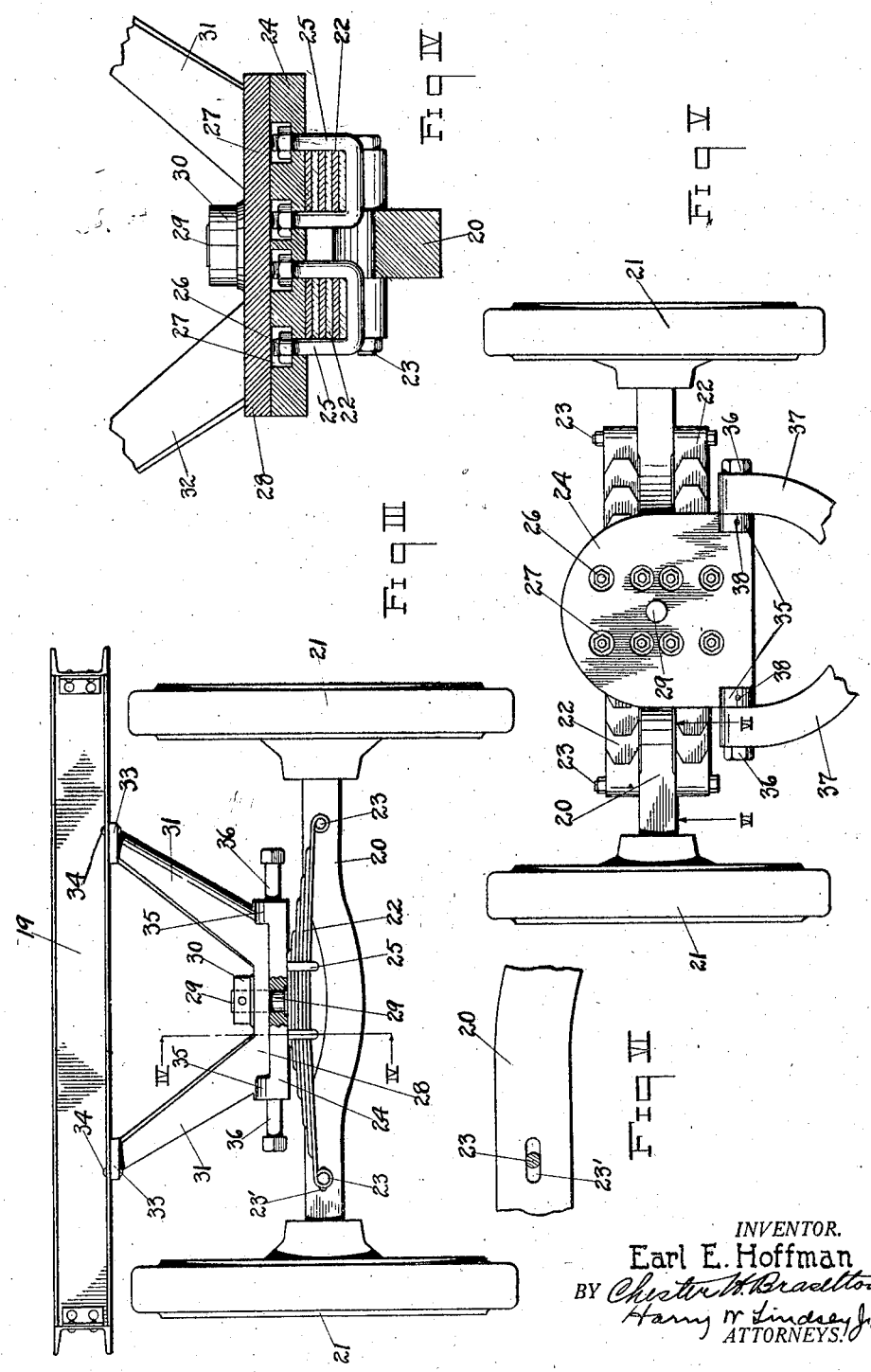

1,521,770

UNITED STATES PATENT OFFICE.

EARL E. HOFFMAN, OF TOLEDO, OHIO, ASSIGNOR TO THE WILLYS-OVERLAND COMPANY, OF TOLEDO, OHIO, A CORPORATION OF OHIO.

VEHICLE STRUCTURE.

Application filed May 26, 1920. Serial No. 384,306.

*To all whom it may concern:*

Be it known that I, EARL E. HOFFMAN, residing at Toledo, county of Lucas, State of Ohio, have invented certain new and useful Improvements in Vehicle Structures, of which I declare the following to be a full, clear, and exact description.

The present invention relates to vehicle structures and has for its object to provide improved means for supporting the body or frame of a vehicle upon an axle.

Another object of the invention is to provide an improved spring suspension for vehicles.

Still another object of the invention is to provide an improved fifth wheel construction for a truck or other types of vehicles.

Another object of the invention is to provide an axle carrying one or more springs having superimposed thereon a fifth wheel adapted for connection to the frame of a truck or other types of vehicles.

Another object of the invention is to provide an improved truck for use in factories which is adapted for turning in a very small space and which will serve as a trailer for attachment to a self propelled power unit and which can be cheaply manufactured and kept in repair by reason of the simplicity of the construction.

To these and other ends the invention comprises certain novel features of construction and arrangement of parts which will be hereinafter more fully pointed out and claimed, it being understood that the structure is susceptible to various modifications both in the detailed forms of construction and arrangement of parts without departing from the spirit of the invention as expressed in the claims.

A construction constituting one embodiment of the invention is illustrated in the accompanying drawings in which:

Figure I is a plan view of a vehicle embodying the invention.

Figure II is a side elevation thereof.

Figure III is a front elevation with certain parts removed to more clearly indicate the construction.

Figure IV is a fragmentary sectional elevation taken on line IV—IV of Figure III.

Figure V is a a top plan view of the front axle and spring suspension with the superstructure removed above the lower half of the fifth wheel and Figure VI is a detailed section taken on lines VI—VI of Figure V.

Similar reference characters indicate corresponding parts throughout the several views of the drawings.

The present invention comprehends an improved truck or trailer, the frame or body of which extends over the front wheels of the vehicle to permit the same to be turned in limited spaces, as in the aisles or narrow passageways of factories and it may be used either as a separate unit for hauling materials or as a trailer adapted for connection to self propelled power units, such as are commonly used in and around factories, although it is not limited to this particular kind of service. One of the chief considerations in designing a truck or vehicle of this kind is to limit the construction to as few parts as possible and at the same time provide a strong supporting structure between the frame and front axle of the vehicle which will permit the wheels to turn beneath the frame. In accomplishing this result I have provided a new and improved fifth wheel construction in combination with a novel form of spring suspension for supporting the front end of the vehicle body or frame.

Referring to the drawings 10 represents the side members of the frame which are connected by the transverse ties or braces 11 to which are secured the downwardly extending brackets 12 and 13, the latter being provided with links 14 with which the rear ends of the spring 15 are connected, the front ends of the springs being directly connected with the brackets 12 as shown in Figure II. The springs 15 are suitably connected with the axle 16 carried by the rear wheels 17 as shown in Figure I. A rearwardly extending draft bar 18 is connected with the end brace member 11 and is adapted for use when it is desired to employ a series of trucks connected one with another. At the front of the side frame members 10 are provided the transverse brace members 19 extending on opposite sides of the front axle 20 carried by the wheels 21. Semi-elliptic springs 22 are mounted on the opposite sides of the axle 20 and are connected therewith preferably by means of bolts 23 extending through the axle and the ends of the springs as shown in Figure III. The bolt at one end of the springs is free to move in the slot 23' formed in the axle while at the other end the bolt is fixed with respect to the axle. By this construction the springs are free to expand under compression and the bolts supporting the springs are thereby relieved of a certain amount of strain which they would otherwise be subjected to. Mounted upon the top of the springs 22 is a plate member 24 constituting the lower half of the fifth wheel of the vehicle, said plate member being connected with the springs preferably by means of the U bolts 25 the ends of which are secured by the nuts 26 positioned within the recesses 27 formed in the upper face of the plate as shown in Figure IV. The lower half of the fifth wheel is thus rigidly secured directly to the springs while the upper half comprising the plate member 28 is superimposed upon the lower half and connected therewith by means of a king pin 29 extending upwardly through the plates into the boss-like projection 30 as shown in Figures III and IV, the king pin being preferably anchored by means of a bolt or cotter-pin extending through the boss 30 and the upper end of the king pin. The upper plate 28 of the fifth wheel is provided with the front and rear upstanding arms 31 and 32 respectively, said arms being preferably inclined outwardly and provided at their upper ends with the feet or lugs 33 by which they are connected to the transverse frame members 19 preferably by means of the rivets 34 as shown in Figure III. The arms or standards 31 and 32 are cast integral with the plate member 28 but may be detachably connected therewith if desired. At the front end of the lower plate member 24 are provided upstanding lugs 35 into which are threaded the laterally projecting bolts 36 with which are connected the rear ends of the draft yoke 37 which may be a single bar having a forked end or separate bars riveted together as indicated in Figure I. The bolts 36 are held against accidental displacement by means of the set screws 38 threaded into the lugs 35 as shown in Figure V.

Although I have shown the draft yoke connected with the bottom portion of the fifth wheel, it will be understood that the same may be connected with the axle if desired.

While I have described my invention more or less in detail, it will be understood that I do not wish to be limited to the specific forms of construction and arrangement of parts shown as it will be apparent that various modifications may be made in the detailed construction and arrangement of the parts without departing from the spirit of the invention as expressed in the claims.

What I claim as new and desire to secure by Letters Patent is:

1. In a vehicle structure, the combination of an axle, springs mounted upon the axle, a plate secured upon the springs, a second plate pivotally disposed upon the first and having arms extending upwardly therefrom for attachment to a vehicle frame, and a draft-member pivotally connected with said first-mentioned plate.

2. In a vehicle structure, the combination of an axle, springs mounted on the axle, a plate secured to said springs having a forwardly extending portion, a second plate pivotally connected to said first plate for rotatably supporting the body of a vehicle and a draft rod pivotally connected to said forwardly extending portion.

3. In a vehicle structure, the combination of an axle having wheels thereon, springs carried by said axle, a plate secured to said springs having an integral forwardly extending portion, a pair of lugs on said portion, a draft rod pivoted to said lugs, a second plate overlying and pivoted to said first plate, said second plate having upwardly extending arms for attachment with the body of a vehicle.

In testimony whereof, I affix my signature.

EARL E. HOFFMAN.